Figure 1:
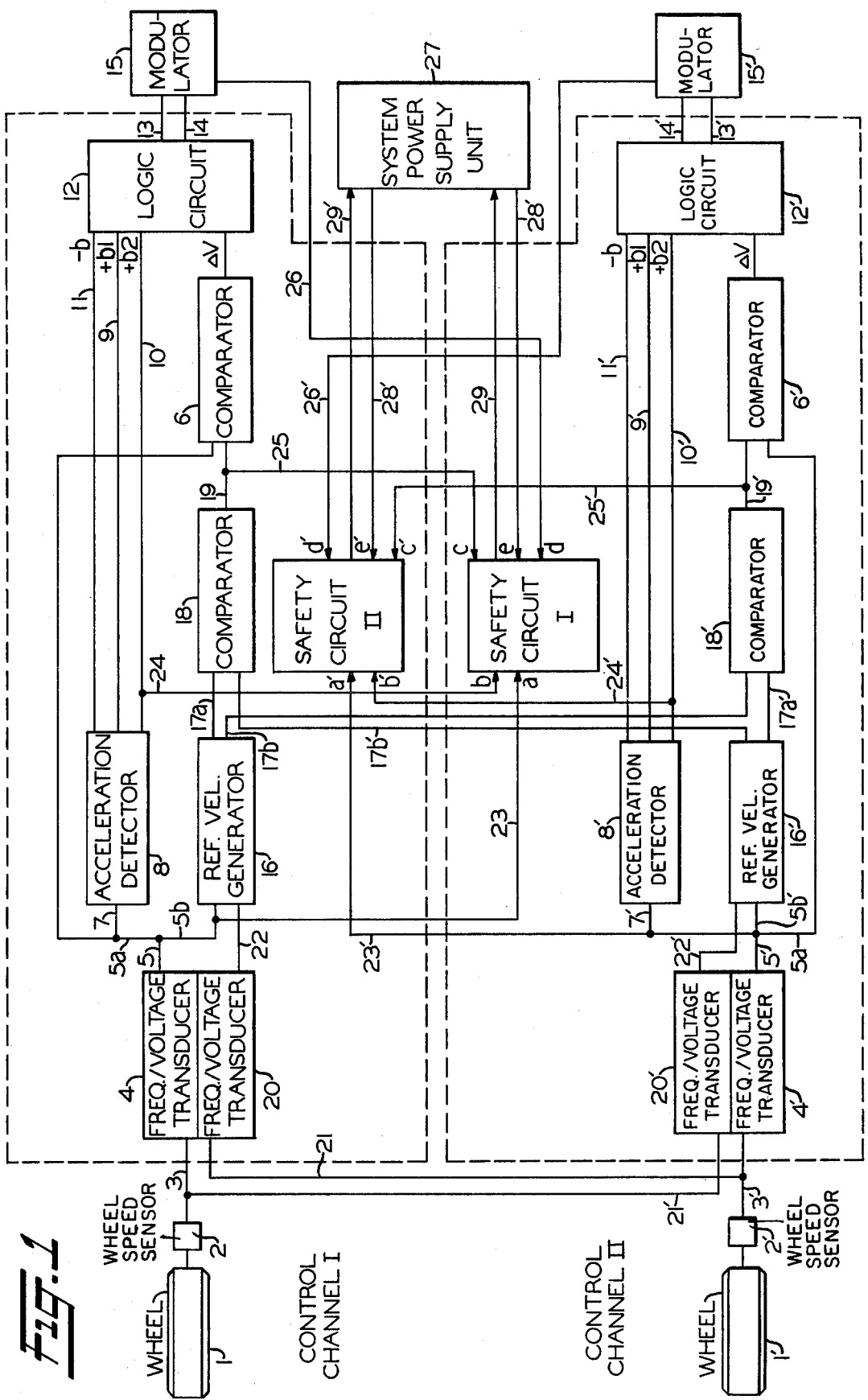

United States Patent [19]

Reinecke

[11] 4,049,325

[45] Sept. 20, 1977

[54] SAFETY CIRCUIT ARRANGEMENT FOR WHEEL ANTI-SKID BRAKE CONTROL SYSTEM

[75] Inventor: Erich Reinecke, Beinhorn, Germany

[73] Assignee: WABCO Westinghouse GmbH, Hannover, Germany

[21] Appl. No.: 697,337

[22] Filed: June 18, 1976

[30] Foreign Application Priority Data

Aug. 5, 1975 Germany ............................ 2534904

[51] Int. Cl.$^2$ .............................................. B60T 8/00
[52] U.S. Cl. .................................... 303/92; 340/52 B
[58] Field of Search ............... 303/92, 106; 307/10 R; 317/27 R, 135 A; 340/52 B, 53

[56] References Cited

U.S. PATENT DOCUMENTS

| | | | |
|---|---|---|---|
| 3,838,889 | 10/1974 | Miller | 303/92 X |
| 3,874,743 | 4/1975 | Fleischer et al. | 303/92 |
| 3,907,378 | 9/1975 | Leiber | 303/92 |
| 3,920,284 | 11/1975 | Lane et al. | 303/92 |

Primary Examiner—Stephen G. Kunin
Attorney, Agent, or Firm—R. W. McIntire, Jr.

[57] ABSTRACT

A wheel anti-skid brake control system in which a safety circuit is provided to monitor critical circuit functions of each wheel control channel and to interrupt power to a circuit having a malfunction in order to prevent adverse influence of the anti-skid control system on the brake pressure, wherein the safety circuit of one wheel is incorporated in the integrated electronic control circuitry of a different wheel control channel so as to remain operative when a malfunction occurs in the control channel circuitry of the one wheel in order to assure that such malfunction is detected.

5 Claims, 2 Drawing Figures

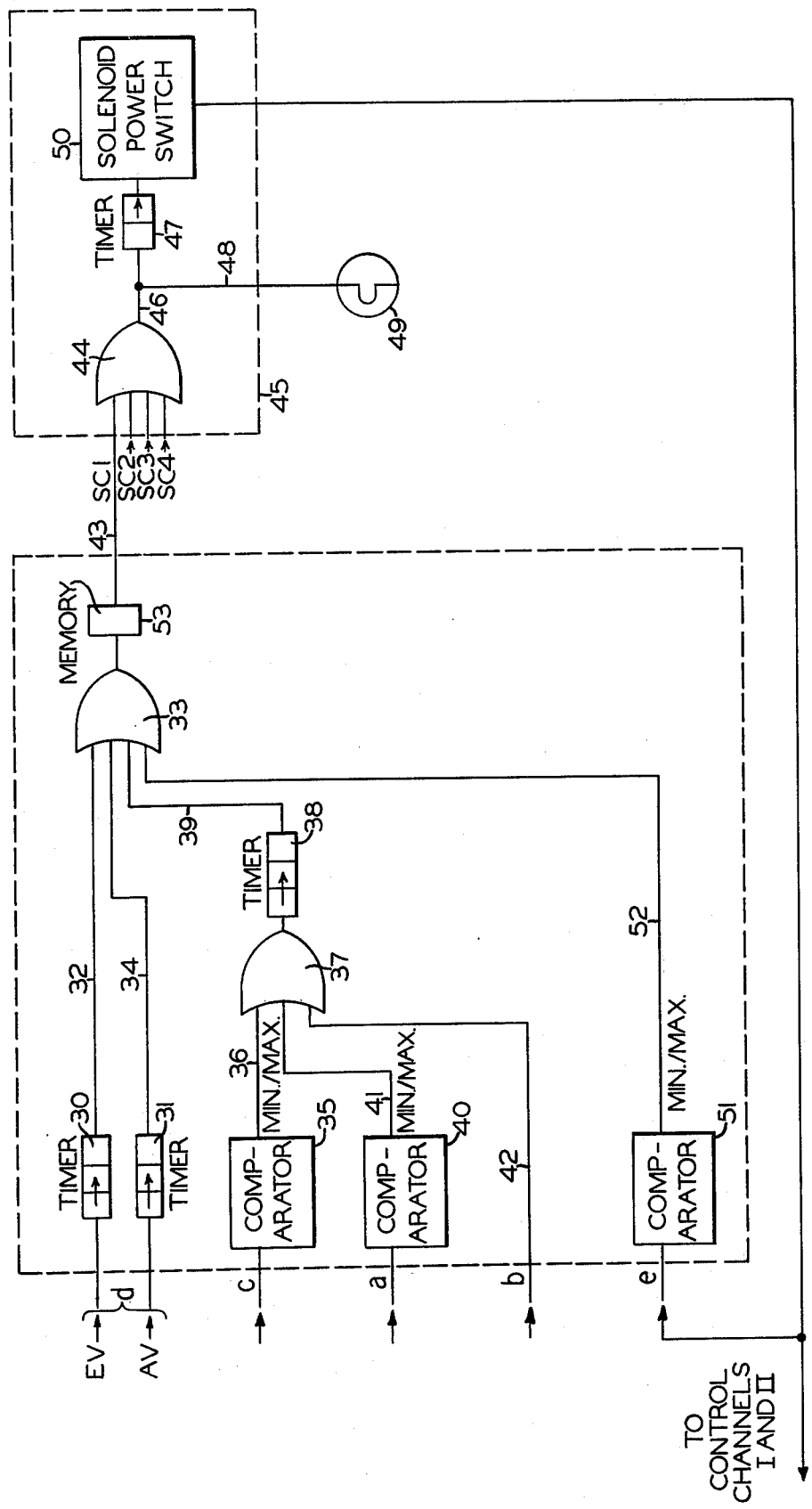

4,049,325

SAFETY CIRCUIT ARRANGEMENT FOR WHEEL ANTI-SKID BRAKE CONTROL SYSTEM

BACKGROUND OF THE INVENTION

The present invention relates to a wheel anti-skid brake control system adapted particularly for automotive type vehicles, such as trucks for example, wherein there is provided separate wheel anti-skid brake control channels for each axle.

In addition to the usual wheel behavior sensing and evaluation circuitry, modulator valve means and power supply unit, each control channel may further include a safety circuit capable of detecting operating malfunctions arising in critical portions of the control channel in order to prevent inadvertent control signals from adversely influencing the anti-skid control system operation. These safety circuits are well-known, being operative responsively to the mentioned inadvertent control signals to cut off the power supply unit from each control channel and thereby interrupt influence of the anti-skid control system on the fluid brake pressure, as controlled by the vehicle operator via the main brake valve device.

Recent technological developments in the field of electronics have reached the point where integrated circuitry is now feasible in the design of an electronic wheel anti-skid brake control system of the above type. In employing integrated circuit design, the control system is no longer able to be separated into individual control circuits for the different control functions performed, since as many circuit functions as possible are concentrated into each integrated circuit chip. For this reason, the possibility exists that the safety circuit of a given control channel may be rendered inoperative in the event a malfunction arises in the integrated circuit of which the safety circuit is a part. Being inoperative, the safety circuit will of course fail to detect a subsequent malfunction for which it is designed to detect and which most likely would arise as a result of the malfunction existing in the integrated circuit. Failure of the safety circuit to monitor malfunctions of the wheel anti-skid control system, of course, results in the possibility of the wheel anti-skid control system exerting an adverse influence upon the wheel brake pressure without the operator being aware of this potentially dangerous situation.

SUMMARY OF THE INVENTION

It is therefore the object of the invention to provide a wheel anti-skid brake control system employing integrated circuitry arranged so that the safety circuit for a given wheel anti-skid control channel remains effective to monitor the integrity and accuracy of certain critical control signals thereof when a malfunction of the integrated circuitry of the given wheel anti-skid control channel exists.

In carrying out this object, the safety circuitry that monitors certain critical malfunctions of one wheel anti-skid control channel is provided in the integrated circuit of a different wheel anti-skid control channel, such other wheel being either on the same axle, on the same side of the vehicle or on the diagonally opposite wheel of a different axle.

Other objects and attendant advantages of the invention will become apparent as the following more detailed explanation proceeds with reference to the accompanying drawings of which:

FIG. 1 is a block diagrammatic showing the wheel anti-skid brake control system as arranged with respect to different wheels of the vehicle; and FIG. 2 is a circuit diagrammatic of a safety circuit and power supply utilized in the wheel anti-skid brake control system comprising the invention.

DESCRIPTION AND OPERATION

Referring to FIG. 1 of the drawings, there is shown a pair of wheels 1, 1' of a vehicle, as for example the nondriven front wheels, having disposed therewith the respective wheel speed sensors 2, 2'. Each wheel speed sensor produces a pulse train whose impulse frequency is proportionate to the angular velocity of the wheel with which it is associated. This wheel frequency signal of each wheel 1, 1' is connected to both of the respective wheel anti-skid brake control channels I and II. The wheel frequency signal provided by speed sensor 2 is connected via a line 3 to a frequency to voltage transducer 4 whose output voltage signal represents the speed of rotation of wheel 1. This speed signal is in turn connected to a reference velocity generator 16 via lines 5 and 5b.

Speed sensor 2' is connected via lines 3' and 21 to a frequency to voltage transducer 20, the output of which carries a voltage signal proportionate to the speed of wheel 1'. This signal is also applied to the reference velocity generator 16 of control channel I via a line 22. From the two speed input signals of the wheels 1 and 1', velocity generator 16 forms a reference velocity signal at its outut which approximates the speed of the vehicle. If the input signals are different, the greater signal is reflected at the output of velocity generator 16. The reference velocity signal is supplied to an input of a comparator circuit 18 by way of a line 17a. A second input of comparator circuit 18 is connected to the output of a velocity generator 16' of control channel 11 via line 17b'. Comparator circuit 18 selects from the two reference signals the smaller signal and supplies it to the first input of a comparator circuit 6 via a line 19. A second input of comparator circuit 6 receives the speed signal of wheel 1 by way of lines 5 and 5a. The comparator circuit 6 forms from the two signals a slip signal $\Delta V$, which is supplied to a logic circuit 12 when the wheel velocity exceeds the vehicle velocity (reference signal) by a predetermined amount. The speed signal of wheel 1 is applied via lines 5, 5a and 7 to an electronic acceleration detector circuit 8, which obtains from its input signal positive acceleration signals $+b1$, $+b2$ and a negative acceleration signal $-b$. These signals are also connected to logic circuit 12 via lines 9, 10 and 11. Logic circuit 12 evaluates all the signals supplied to it and produces control signals at lines 13 and 14, which are connected to modulator valve unit 15, by means of which the brake pressure of wheel 1 is influenced.

Control channel II is arranged to influence the fluid brake pressure effective at wheel 1' the same as that of the control channel I for the wheel 1 described above. In FIG. 1, the corresponding elements and lines comprising control channel II are indicated by like reference numerals distinguished by a prime mark. The angular speed sensor 2' is connected with a frequency to voltage transducer circuit 4' by way of a line 3'. The output of circuit 4' is a voltage signal, which is proportionate to the speed of the wheel 1' and which is applied to a reference unit 16' via lines 5 and 5b'.

Speed sensor 2 of wheel 1 is connected with a frequency to voltage transducer circuit 20' by way of the lines 3 and 21. The output signal from circuit 20' is a voltage signal proportionate to the speed of wheel 1, which is applied to a reference volocity generator 16' via a line 22'. From the two speed input signals of the wheels 1' and 1, velocity generator 16' forms a reference signal which approximates the speed of the vehicle. If the input signals are different, the greater signal is reflected at the output of unit 16'. The reference signal is supplied to an input of a comparator circuit 18' by way of a line 17'. A second input of comparator circuit 18' is connected to the output of velocity generator 16' of control channel I via line 17b. Comparator circuit 18' selects from the two reference signals the smaller signal and supplies it to a first input of a comparator circuit 6' by way of a line 19'. A second input of comparator circuit 6' receives the speed signal of wheel 1' by way of lines 5' and 5a'. The comparator circuit 6' forms from the two signals a slip signal $\Delta V$, which is supplied to the logic circuit 12'. Via the lines 5', 5a' and 7', the speed signal of wheel 1' is supplied to an electronic acceleration detector circuit 8', which obtains from its input signal positive acceleration signals $+b1$, $+b2$ and a negative acceleration signal $-b$. These signals are also connected to logic circuit 12' via lines 9', 10' and 11'. Logic circuit 12' evaluates all the signals supplied to it and produces control signals at lines 13' and 14', which are connected to a modulator valve unit 15' by means of which the brake pressure is influenced.

The electronic part of the control channel II consisting of the two frequency to voltage transducer circuits 4' and 20', the acceleration detector circuit 8', the reference velocity generator circuit 16', the comparator circuit 18', the comparator circuit 6' and the logic circuit 12', is provided with a safety circuit SC I which checks the functioning of control channel I, as hereinafter explained.

A second safety circuit SC II, which checks the functioning of the circuitry of control channel II, is associated with the circuits comprising control channel I.

The electronic circuits of control channel II and safety circuit SC I are combined in a single integrated unit. The electronic circuits of control channel I and safety circuit SC II are integrated in a single unit in a like manner. In the drawing of FIG. 1, the control channels are each indicated by a broken line enclosing them.

Safety circuit SC I has five inputs a, b, c, d and e. The speed signal of wheel 1 arrives from transducer circuit 4 at input a of safety circuit SC I by way of lines 5, 5b and 23. In this circuit the signal is checked as to inadmissibly high or low values. Acceleration signal $+b2$ is applied via lines 10 and 24 to the input b of safety circuit SC I, where it is checked as to inadmissibly long switch-on times. The reference velocity signal reaches input c via line 25 and is checked, like the speed signal, as to inadmissible maximum or minimum values. A line 26 connects the modulator valve unit 15 with input d of safety circuit SC I, so that the switch-on times of modulator valve unit 15 are also checked. The supply voltage is checked as to deviations by way of a line 28 connecting input e of safety circuit SC I with an output of a power supply unit 27, which provides the proper voltage requirements for the integrated circuitry of control channels I and II. If any one of these signals of control channel I is faulty or the entire unit I breaks down, then this is detected by safety circuit SC I, which is integrated with and thus powered electronically via circuitry comprising control channel II. The output of safety circuit I acts via a line 29 to deactivate power supply unit 27 after a predetermined warning period, thereby cutting off the supply of voltage to both control channels I and II to prevent the detected circuit malfunction from affecting vehicle braking.

In the same manner, the electronic circuitry comprising control channel II is connected to safety circuit SC I that is integrated in the electronics comprising control channel II.

Safety circuit SC II has five inputs a', b', c', d' and e'. The speed signal of wheel 1' arrives from transducer circuit 4' at the input a' of the safety circuit SIS II by way of the lines 5', 5b' and 23'. In this circuit the signal is checked as to inadmissibly high or low values. Acceleration signal $+b2$ is applied via lines 10' and 24' to the input b' of safety circuit SC II, where it is checked as to inadmissibly long switch-on times. The reference velocity signal reaches the input c' via the line 25' and is checked, like the speed signal, as to inadmissible maximum or minimum values. A line 26' connects the modulator valve unit 15' with the input d' of safety circuit SC II, so that the switch-on times of the modulator valve unit 15' are also checked. The supply voltage is checked as to deviations by way of a line 28' connecting the input e' of safety circuit SC II with an output of power supply unit 27.

If one of these signals of control channel II is faulty or the entire unit II breaks down, this is detected by safety circuit SC II, which is integrated with and thus powered via the electronic part of control channel I. The output of safety control SC II acts via a line 29' to deactivate power supply unit 27 after a warning period, thereby cutting off the supply of voltage to both control channels I and II to protect the vehicle brake system from being adversely affected by the defected malfunction of the anti-skid control system.

FIG. 2 shows the elements comprising a safety circuit, as well as the connection of the safety circuit with power supply unit 27. Although not shown, modulator valve unit 15, 15' may comprise a solenoid inlet valve EV and/or solenoid outlet valve AV, which are operated in accordance with the outputs 13, 13' and/or 14,14' of the respective control channel logic circuits I, II. In its energized condition, a signal is supplied from the solenoid inlet valve EV to a conventional timer device such as a response time delay relay 30. Similarly, a signal is sent from the solenoid outlet valve AV to a response time delay element 31 when solenoid valve AV is energized. These signals are represented by the letter d at one input of safety circuit SC II, by letter d" at one input of safety circuit SC II, etc. The response time delay elements 30, 31 are so designed that these control signals are delayed by 2.5 seconds on the front axle and by 5 seconds on the rear axle. If these control signals are present for a longer time duration, this is detected as being faulty and the error signal is conveyed to an OR-gate 33 via lines 32, 34.

The reference speed signal is present at input c where it is checked in a comparator 35 as to inadmissibly high or inadmissably low values. The error signal at the comparator output is applied to an OR-gate 37 by way of a line 36.

The speed signal at input a is connected to a comparator 40 where it is compared with predetermined high and low threshold values. In the event signal a exceeds these threshold limits, comparator 40 switches the error signal to the OR-gate 37 by way of a line 41. In addition, the $+b2$ signal, which is present at input b, is connected to OR-gate 37 by way of a line 42. Should there be a signal present at either input of OR-gate 37, then OR-gate 37 passes a signal to an input of OR-gate 33 by way of a conventional time delay relay element 38 and a line 39.

The stabilized supply voltage from power supply unit 27 is checked as to inadmissible values via input e to which a comparator 51 is connected. If the supply voltage at input e exceeds a threshold value established by comparator 51, an output signal is applied to OR-gate 33 by way of a line 52. If an input of OR-gate 33 has an error signal, this is stored in a memory circuit 53. The stored error signal is connected from the safety circuit to an OR-gate 44 within power supply unit 27 via line 43. OR-gate 44 combines the error signals of all the control channels. In the event of a malfunction, a warning light 49, connected with the output of OR-gate 44 by way of the lines 48 and 46, is switched on. A time delay element 47 is connected to line 46 in parallel with the warning light 49. After a predetermined warning time of 20 seconds, for example, the electronic system is deactivated through a solenoid operated switch 50 in the line connecting power to the respective control channels. Consequently, brake pressure is supplied to the wheel brake cylinders under control of the vehicle operator without any wheel anti-skid brake control. This assures that a malfunction in one of the anti-skid control channels will have no adverse affect upon the wheel brake pressure, it being appreciated that the arrangement of a safety circuit of one wheel control channel with the electronics of another wheel control channel allows the safety circuit of a control channel having a malfunction to remain operative to detect such malfunction, even when the malfunction affects the supply of power to the control channel.

Having now described the invention, what I claim as new and desire to secure by Letters Patent, is:

1. An anti-skid control system for the fluid pressure operated brakes of a road vehicle having at least two wheels, comprising:
    a. first and second electronic control channels for a first and second one of said wheels, respectively, each said control channel being of integrated circuit construction formed on separate integrated circuit chips;
    b. said first control channel including:
        i. means for evaluating the dynamic behavior of said first wheel; and
        ii. a safety circuit for monitoring preselected fault conditions of said second control channel;
    c. said second control channel including:
        i. means for evaluating the dynamic behavior of said second wheel; and
        ii. a safety circuit for monitoring preselected fault conditions of said first control channel;
    d. modulator valve means for influencing the fluid brake pressure at the brakes of a respective one of said first and second wheels in response to output signals from said first and second control channels; and
    e. power supply means for normally providing a source of electrical energy to activate said first and second control channels, said power supply means being cut off from said first and second control channels when any of said preselected fault conditions of either of said first and second control channels is detected by said safety circuit thereof to deactivate said first and second control channels and thereby inhibit operation of said anti-skid brake control system.

2. A wheel anti-skid brake control system as recited in claim 1, further characterized in that said first and said second wheels are on the same axle of said vehicle.

3. A wheel anti-skid brake control system as recited in claim 1, further characterized in that said first and said second wheels are on the same side of said vehicle.

4. A wheel anti-skid brake control system as recited in claim 1, further characterized in that said first and said second wheels are diagonally disposed on different axles of said vehicle.

5. A wheel anti-skid brake control system as recited in claim 1, wherein said power supply means comprises:
    a. an OR gate having inputs to which the output of said safety circuit means of each said control circuit is connected and an output;
    b. solenoid operated switch means connected to said output for interrupting the supply of electrical power when a signal is present at any one of said inputs of said OR gate;
    c. means connected to said output in parallel with said switch means for indicating the presence of a malfunction of one of said electronic control circuits; and
    d. means for delaying operation of said switch means for a predetermined duration following operation of said indicator means.

* * * * *